United States Patent Office 2,908,680
Patented Oct. 13, 1959

2,908,680
PROCESS FOR PREPARING CRYSTALLINE ANTIBIOTIC

James Gillin, Westfield, N.J., assignor to Merck & Co., Inc., Rahway, N.J., a corporation of New Jersey No Drawing. Application April 4, 1957
Serial No. 650,562

13 Claims. (Cl. 260—210)

This invention relates to the new antibiotic agent novobiocin and more particularly to a new and improved method for preparing and monosodium salt of novobiocin.

The antibiotic novobiocin, which is also known by the name "Cathomycin," a trade name of Merck & Co., Inc., is formed by growing, under controlled conditions, a new species of microorganism which has been designated in the culture collection of Merck & Co., Inc., Rahway, New Jersey, as *Stroptomyces spheroides* MA–319. A culture of this organism has been deposited with the Fermentation Section of the Northern Utilization Research Branch, United States Department of Agriculture at Peoria, Illinois, and added to its permanent culture as NRRL 2449.

The production of novobiocin through the aerobic fermentation of suitable aqueous mediums by strains of *Stroptomyces spheroides* and the preparation of salts of novobiocin are disclosed and claimed in the pending application for Letters Patent of the United States of Wallick Wolf and Kaczka originally filed on April 21, 1955, and refiled on March 7, 1956, under Serial No. 570,184. It is there disclosed that novobiocin is an acidic substance having two basic binding groups. The first binding to form a monosodium salt occurs at a pH of about 7.0 and has a pK of about 3.8. The second binding occurs at a pH of about 11.0 and has a pK of about 9.4.

The monosodium salt of novobiocin is particularly active against penicillin resistant staphylococci and against streptococci and pneumococci, organisms which are responsible for most bacterial respiratory infections. In human therapy the sodium salt of novobiocin can be administered orally in the form of capsules containing, for example, about 100 to 500 mgs. of the antibiotic at a daily dose level of 1 to 2 grams. Thus a suitable dosage form is a No. 1 soft gelatin capsule containing 250 mgs. of the monosodium salt. Alternatively, tablets can be prepared by mixing the powdered monosodium salt with a small amount of a 5% solution of cellulose acetate hydrogen phthalate in methanol-acetone (50–50), granulating the material through a No. 8 sieve, drying the resulting granules, putting the dried granules through a No. 12 sieve, and compressing the resulting granules with the addition of a small amount of magnesium stearate to form tablets containing about 250 mg. of sodium novobiocin.

Novobiocin, and in particular the monosodium salt thereof, is also effective in the treatment of certain plant diseases. Thus, for example, an aqueous solution containing about 100 p.p.m. of the monosodium salt can be used as a spray to control the bean blight caused by *Xanthomonas phaseoli*. Such sprays can contain various wetting or spreading agents and/or other active agents, and can be prepared in accordance with methods well known in the art.

These and other uses for the monosodium salt of novobiocin make it extremely desirable to provide an inexpensive and practical method for the preparation of monosodium salt; and the present invention is concerned with a new and superior method whereby relatively impure novobiocin acid can be directly converted to the crystal monosodium salt of novobiocin.

The novel process in accordance with the present invention comprises dissolving novobiocin acid having a purity in excess of about 80% in a mixed organic solvent containing about 2 to 4 parts by volume of a 1 to 4 carbon alcohol to 1 part by volume of an aromatic solvent selected from the group consisting of benzene, toluene and xylene, adding to the mixed organic solvent solution sodium methoxide in an amount to provide a pH of about 7.2 to thereby directly precipitate crystalline monosodium novobiocin. In this process the preferred organic solvent mixture is 2:1 methanolbenzene, since this solvent mixture provides very good yield (regularly in excess of 90% of theory), and also yields directly a product of good color and high purity.

In carrying out the process, the sodium methoxide is preferably added in methanol solution. Following the addition of sodium methoxide and resulting crystal formation, additional aromatic solvent is preferably added with extended agitation to enhance the yield of crystalline monosodium salt. The quantity of aromatic solvent thus added is suitably about 5 to 8 times the amount of aromatic solvent in the initial solvent mixture. The use of less than about 5 volumes of supplemental aromatic solvent will not give the desired increase in yield of crystalline product, whereas more than about 8 volumes of supplemental aromatic solvent tends to impair the color of the product.

The use of a 2:1 methanol-benzene solvent mixture during crystallization appears to be unique in its effectiveness for the retaining of colored impurities to give a nearly pure white crystalline monosodium salt of novobiocin. The substitution of other alcohol, such as ethanol and propanol creates something of a problem due to decreasing solubility of the novobiocin acid in solvent mixtures containing higher alcohols in the $C_1$ to $C_4$ range. While this decrease in solubility can be offset by using greater amounts of the solvent mixture, it will be evident that it is preferable to employ a solvent mixture with which the volume of the solvent to be handled can be kept at a minimum.

The substitution of other aromatic solvents, such as toluene and xylene for the benzene of the preferred solvent mixture is satisfactory from the standpoint of yield, but the product isolated is of somewhat inferior color.

With respect to the preferred solvent mixture of 2:1 methanol-benzene, the inclusion of additional alcohol up to a ratio of about 4:1 has no adverse effect on the product, but at the same time has no beneficial effect, and therefore is preferably avoided as unnecessarily increasing the volume of solvent to be handled. On the other hand, reduction in the proportion of methanol substantially below the 2:1 ratio adversely affects the process and should be avoided.

The process is suitably carried out at room temperature, i.e. about 25–30° C. After dissolving the novobiocin free acid in the solvent mixture, the solution is preferably filtered as through filter paper coated with diatomaceous earth filter aid to remove any undissolved matter. Freshly prepared sodium methoxide in methanol is also preferably filtered, while being protected from exposure to air. The sodium methoxide solution is gradually added to the novobiocin acid solution with agitation until a pH of about 7.1 is reached, and then additional amounts are carefully added with agitation to a pH of about 7.2–7.3 at which point the crystallization begins. The slurry of crystalline monosodium novobiocin is agitated for about an hour. Then benzene is added in the amount of about 5 to 8, and preferably about 7½, times the volume present in the original solvent mixture and stirring is continued for about an hour. The crystalline product is then filtered off, washed with benzene, substantially freed of residual solvent while taking care to exclude atmospheric moisture, and the resulting cake is then dried in a vacuum oven of about 50° C.

The resulting crystalline monosodium novobiocin is freely soluble in water, almost pure white in color, in excess of 90% pure, and for many intended uses can be utilized without further purification.

The following examples will serve to show how the process of the present invention can be practiced. It is to be noted, however, that Example I, which is concerned merely with the preparation of the starting novobiocin acid, is taken from said co-pending application of Wallick, Wolf and Kaczka Serial No. 570,184, and forms no part of the present invention. It is further understood that these examples are given by way of illustration and not of limitation.

EXAMPLE I

A Blake bottle containing 25 ml. of sterile aqueous agar medium consisting of

1% yeast extract
1% dextrose
0.12% $Na_2HPO_4$
0.075% $KH_2PO_4$
0.05% $MgSO_4.7H_2O$
2% agar dissolved in water was inoculated with a loopful of soil from a soil culture of *Streptomyces spheroides* MA–319 (NRRL 2449) and incubated at 26° C. for 4–5 days until well sporulated.

Twenty ml. of sterile water was then added to the Blake bottle and the spore scraped into suspension. About 5 ml. of the resulting spore suspension was added to a 2 liter baffled Erlenmeyer flask containing 750 ml. of a sterile aqueous medium consisting of 0.3% beef extract
1.0% casein hydrolysate (NZ amine)
10% dextrose
0.5% sodium chloride and having a pH of about 7.2. The flask was then stoppered with cotton and incubated at 26° C. on a rotary shaker for 48 hours.

The vegetative culture so prepared was then added to a 50 gallon stainless steel fermentor containing about 25–30 gallons of a sterile beef extract medium of the composition described above. After adding a small quantity of a 1% solution of octadecanol in mineral oil as an antifoam agent, the medium was incubated at 26° C. for 48 hours. During this incubation period the medium was agitated and sterile air was passed through the medium at the rate of about 3 c.f.m.

A 200 gallon stainless steel fermentor was then charged with about 100 gallons of an aqueous medium containing the following ingredients:

3% soybean meal (Staley's Special Nutrient Soybean Meal 4–S)
2% dextrose
0.75% distillers' solubles
0.25% sodium chloride This medium had a pH of about 7.1. After sterilizing the medium with steam at about 120° C. for thirty minutes and cooling, the fermentor was inoculated with about 8.4% of the vegetative inoculum prepared in the 50 gallon fermentor as described above. The batch was then incubated at 26° C. with agitation and aeration at the rate of 12 c.f.m. After 96 hours the fermented broth containing the antibiotic novobiocin had an activity of about 82 mcg. per ml.

After filtering the whole broth at pH 9.0, 5 lbs. of diatomaceous earth filter aid (Hyflo Supercel) per 100 gal. of filtered broth was added. The broth was slowly acidified to pH 2.0 with hydrochloric acid. After 10 minutes agitation the batch was filtered and the cake washed with water. No antibiotic can be detected in the acid filtrate. The solids precipitated, exclusive of the filter aid, were ca. 0.2–0.3% pure.

The filter cake from acid precipitation was extracted twice with 85% aqueous methanol at pH 9.0 using approximately one-tenth the original broth volume for each extraction. Overall recovery through this extraction was approximately 80% of the total bioactivity present in the broth. The solids in solution were 1–1.5% pure.

The aqueous methanol solution was concentrated to a water solution, ca. one-tenth the volume of the original methanol solution. The pH was adjusted to 9.0 with caustic soda and the solution was extracted twice with equal volumes of n-butanol. The apparent distribution ratio at pH 9.0 is ca. 40:1. The solids in the butanol extract were 4–6% pure.

The butanol extract was concentrated to one-tenth the original volume and added to 15 volumes of water at pH 9.0. Filter aid (Hyflo Supercel) was added (ca. 0.5 gm./gal. based on original broth volume) and the pH was slowly adjusted to 2.0 by the addition of hydrochloric acid. All of the bioactivity is precipitated on the filter aid and is filtered off. Solids purity, exclusive of the filter aid, was ca. 1–12%.

The cake was dried in vacuo at 40° C., milled and triturated with petroleum ether (about 180–400 ml. for the solids derived from each gallon of fermentation broth) until the filtrate was colorless. This eliminates 20–25% of the solids present and removes inactive oily fermentation products which remained through previous processing. No bioactivity was lost by this trituration and the solids remaining were found to be 12–15% pure.

The cake was extracted with anhydrous ethanol until the ethanol extracts were very light yellow in color. These extracts were combined and concentrated to a solution of 15–20% solids with a bioassay of ca. 40,000 mcg./cc. This solid material was 20–30% pure with a bioassay of 200–300 mcg./mg.

The concentrated ethanol solution was chromatographed on acid-washed alumina. An alumina ratio of 50:1, based on total solids present in the feed solution, must be used in order to obtain a satisfactory purification. The active material passes on through the column while a large amount of the extraneous solid material present remains on the column. The alumina column was washed with ethanol to recover the novobiocin. Approximately 95% of the bioactivity was in 2.5–3 column void volumes.

Table 1

| | Volume (cc.) | Bioassay (mcg./cc.) | mg./cc. | mcg./mg. | Total Units |
|---|---|---|---|---|---|
| Col. Feed | 1,000 | 44,000 | 265 | 166 | $220 \times 10^6$ |
| Cut I [1] | 1,000 | 92 | 2.5 | 37 | $0.46 \times 10^6$ |
| Cut II | 1,000 | 8,400 | 19.6 | 428 | $42 \times 10^6$ |
| Cut III | 1,000 | 15,200 | 31.3 | 484 | $76 \times 10^6$ |
| Cut IV | 1,000 | 12,400 | 22.3 | 556 | $62 \times 10^6$ |
| Cut V | 1,000 | 7,400 | 13.4 | 552 | $37 \times 10^6$ |
| Cut VI | 1,000 | 2,600 | 4.5 | 604 | $13 \times 10^6$ |
| Cut VII | 1,000 | 900 | 1.3 | 690 | $4.5 \times 10^6$ |
| Average of Cuts | 7,000 | 6,700 | 13.2 | 504 | |

Volume of alumina=8,000 cc.
Column void vol.=2,600 cc.
[1] (1st color).

The ethanol washes from the alumina column were concentrated to ca. 5% solids. Water was added to turbidity, slightly more than an equal volume being used, and the antibiotic allowed to crystallize. The crystallization took place very slowly. After five days there still remained in the supernatant liquors up to 15% of the original bioactivity. Agitation and/or temperature variation appear to have little effect upon the rate of crystallization.

This crystalline novobiocin has a bioassay of about 500–600 mcg./mg.

This crystalline material was dissolved in anhydrous acetone to give a 30% solution. This solution was treated with an amount of activated charcoal (Darco G-60) equal to twice the weight of the crystalline material dissolved. The Darco was filtered off and washed repeatedly with acetone to dilute the solution to a concentration of about 5% solids. Petroleum ether was added to turbidity and the novobiocin allowed to crystallize. 90–95% of the bioactivity was recovered and the crystalline novobiocin obtained assayed 900–1,000 mcg./mg.

Other procedures for the recovery of novobiocin acid from fermentation broths are available, and it is to be understood that any recovery procedure which will yield novobiocin acid having a purity in excess of about 80% can be employed for direct conversion to the crystalline monosodium salt of novobiocin as disclosed in the following examples.

EXAMPLE II 2350 ml. of methanol and 1175 ml. of benzene were mixed in a five gallon solution bottle. 1175 gm. of novobiocin free acid having a purity of 88.5%, was added to the mixture with agitation, at 25–30° C. The solution was filtered on a Büchner funnel through filter paper precoated with 15 gm. of diatomaceous earth filter aid (Supercel). The solution bottle was flushed with 450 ml. of 2:1 methanol-benzene mixture. This solution served as wash of the filter.

120 gm. of fresh sodium methoxide was dissolved in 1200 ml. of methanol. The slightly turbid solution was clarified by filtration through sintered glass precoated with diatomaceous earth filter aid (Supercel). The clear filtrate was protected from exposure to air. The sodium methoxide solution was slowly added to the novobiocin solution over a period of one-half hour, with agitation, until a pH of 7.1 was reached. Additional sodium methoxide solution was added cautiously until a pH of 7.2–7.3 was obtained, at which pH crystallization began. About 1150 ml. of the sodium methoxide solution was required to reach the proper pH. The sodium novobiocin slurry was agitated for one hour at 25–30° C. 8800 ml. of benzene was then added over a ten minute period, and agitation was continued for a second hour, at 25–30° C.

The crystalline monosodium novobiocin was filtered off on a Lapp porcelain filter set with paper. The cake was washed with 4 x 500 ml. of benzene, slurrying the cake before sucking off the wash. After the last wash, a rubber dam was applied and residual liquor was sucked off. Care was taken to protect from atmospheric moisture. The cake was dried in a vacuum oven at 50° C.

$E_1\%$ 3070 A. in 0.1 N NaOH=593
Yield, 983 gm. (91.4% of theory)

In the foregoing example the procedure can be varied by increasing the ratio of methanol to benzene to a ratio of about 4:1 without adversely affecting the product or yield. A decrease of the proportion of methanol substantially below the 2:1 ratio does, however, have adverse affects on the process, and the 2:1 ratio is considered to be a practical optimum ratio.

EXAMPLE III

The procedure of Example II was repeated on a small scale initially dissolving 5 grams of novobiocin acid in 15 cc. portions of 2:1 solvent mixtures of methanol-benzene, methanol-toluene and methanol-xylene. Each of these solutions was treated with methanolic sodium methoxide to yield crystalline monosodium novobiocin as described in Example II. The yields in these comparative runs were respectively 3.15 grams using benzene, 2.95 grams using toluene, and 3.60 grams using xylene. The product obtained using benzene was substantially pure white in color, whereas substantial colored impurities were present in the product obtained using toluene, and greater amounts of colored impurities were present in the product obtained using xylene. In this comparative run, the yields were all relatively low as compared with the yields of 90% or better obtained when the process is carried out on a larger scale.

EXAMPLE IV

When the procedure of Example II was repeated using 2 to 1 ethanol-benzene and 2 to 1 isopropanol-benzene as the mixed solvent, it was impossible to dissolve the same amount of novobiocin acid as in an equivalent amount of 2:1 methanol-benzene. This can be offset by employing a greater amount of the mixed solvent for a given amount of novobiocin acid. Also increasing the alcohol to benzene ratio from 2:1 to about 4:1, serves to somewhat increase the solubility of novobiocin acid. When solutions of novobiocin acid in ethanol-benzene and isopropanol-benzene are treated with methanolic sodium methoxide as described in Example II, crystalline monosodium novobiocin of good color is obtained.

While the solvent mixture of 2:1 methanol-benzene provides a most efficient adaptation of my process from the standpoint of purity of product and solvent efficiency, it is to be noted that the optimum conditions of any of the solvent mixtures above described will be obtained when the proportion of novobiocin acid to mixed organic solvent in the starting solution is such as to provide a substantially saturated solution of novobiocin acid in the mixed solvent. With the 2:1 methanol-benzene substantial saturation is obtained by dissolving novobiocin acid at the rate of about 1 gm. to 3 ml. of the solvent mixture. The precise amount of novobiocin acid to be used in particular instances will be influenced to some extent by the purity of the novobiocin acid.

Various changes and modifications in the procedures herein described may occur to those skilled in the art, and to the extent that such changes and modifications are embraced by the appended claims, it is to be understood that they constitute part of my invention.

I claim:

1. The process for preparing crystalline mono-sodium novobiocin that comprises dissolving novobiocin acid in a mixed organic solvent containing 2 to 4 parts by volume of a 1 to 4 carbon alcohol and 1 part by volume of an aromatic solvent selected from the group consisting of benzene, toluene and xylene, adding with agitation to the mixed organic solvent solution methanolic sodium methoxide in an amount to provide a pH of about 7.2–7.3, and recovering the crystalline monosodium novobiocin thereby formed.

2. The precess as defined in claim 1 wherein the initial dissolution of novobiocin acid, reaction with sodium methoxide, and crystallization of monosodium novobiocin are effected with agitation at a temperature of about 25–30° C.

3. The process as defined in claim 1 wherein recovery of the crystalline monosodium novobiocin is effected by filtering off the crystals, washing the crystals with benzene, removing the bulk of the benzene without exposing the crystals to atmospheric moisture, and drying the crystals under vacuum at about 50° C.

4. The process as defined in claim 1 wherein an amount of novobiocin acid is dissolved in the mixed organic solvent to provide a substantially saturated solution.

5. The process as defined in claim 1 wherein the mixed solvent solution of novobiocin acid and the methanolic sodium methoxide are both filtered prior to combining the same to remove any insoluble components.

6. The process as defined in claim 5 wherein following the addition of sodium methoxide, supplemental aromatic solvent is added in the amount of about 5 to 8 times the volume thereof present in the mixed organic solvent.

7. The process for preparing crystalline monosodium novobiocin that comprises dissolving novobiocin acid in 2:1 methanol-benzene, adding to the resulting solution with agitation methanolic sodium methoxide in an amount to provide a pH of about 7.2–7.3, and recovering the crystalline monosodium novobiocin thereby formed.

8. The process as defined in claim 7 wherein the initial dissolution of novobiocin acid, reaction with sodium methoxide, and crystallization of monosodium novobiocin are effected with agitation at a temperature of about 25–30° C.

9. The process as defined in claim 7 wherein recovery of the crystalline monosodium novobiocin is effected by filtering off the crystals, washing the crystals with benzene, removing the bulk of the benzene without exposing the crystals to atmospheric moisture, and drying the crystals under vacuum at about 50° C.

10. The process as defined in claim 7 wherein an amount of nonobiocin acid is dissolved in the mixed organic solvent to provide a substantially saturated solution.

11. The process as defined in claim 10 wherein a substantially saturated solution is obtained by dissolving novobiocin acid at the rate of about 1 gm. for each 3 ml. of the 2:1 methanol-benzene.

12. The process as defined in claim 7 wherein the mixed solvent solution of novobiocin acid and the methanolic sodium methoxide are both filtered prior to combining the same to remove any insoluble components.

13. The process as defined in claim 6 wherein following the addition of methanolic sodium methoxide supplemental benzene is added in the amount of about 5 to 8 times the volume of benzene present in the initial solvent mixture.

References Cited in the file of this patent

UNITED STATES PATENTS 2,678,929    Grundy et al. _____ May 8, 1954

OTHER REFERENCES

Florey et al.: "Antibiotics," vol. II, Oxford Univ. Press (N.Y.), 1949, pages 747 and 748.